United States Patent [19]

Butler

[11] 4,190,392
[45] Feb. 26, 1980

[54] STACK SIDE EVENER

[75] Inventor: L. Dennis Butler, Kingsburg, Calif.

[73] Assignee: Sperry Rand Corporation, New Holland, Pa.

[21] Appl. No.: 891,972

[22] Filed: Mar. 30, 1978

[51] Int. Cl.² .................... A01D 87/12; B65G 57/32
[52] U.S. Cl. ...................................... 414/39; 193/44; 198/456; 414/501
[58] Field of Search ....... 214/6 B, 6 C, 6 P, 518–522; 198/456, 458; 271/248, 251; 193/44, 38, 39; 414/38, 39, 40, 501–505

[56] References Cited

U.S. PATENT DOCUMENTS

| | | | |
|---|---|---|---|
| 458,945 | 9/1891 | Crane et al. | 271/251 |
| 2,302,067 | 11/1942 | Spiess | 271/251 |
| 3,163,302 | 12/1964 | Pridgeon | 214/6 B |
| 3,724,684 | 4/1973 | Butler et al. | 214/6 B |
| 3,910,402 | 10/1975 | Dean | 198/458 X |
| 4,088,231 | 5/1978 | Zipser et al. | 214/6 B |

Primary Examiner—L. J. Paperner
Attorney, Agent, or Firm—John B. Mitchell; Frank A. Seemar; Ralph D'Alessandro

[57] ABSTRACT

A bale wagon employing a stack side evener comprising, in its most simple form, a plurality of fixed, spaced apart parallel fins which passively direct a moving bale toward a predetermined position. Generally, the type of bale wagon given consideration in the instant application includes a bale-receiving area onto which bales are deposited, a bale-accumulating area upon which tiers of bales are assembled, and a load rack upon which multiple tiers of bales are deposited to accomplish the formation of a stack. The wagon further includes some mechanism for moving bales from the bale-receiving area to the bale-accumulating area. The stack side evener comprises a multiplicity of fixed fins which engage the bottom of the bale during the transfer step described, and guide it toward a stop member which serves to commonly orient one side of the tier being formed. In its most complex form, the stack side evener further includes a cross conveyor on the bale-receiving area which employs conveyor flights which are angularly oriented similarly to the fins. When the transfer mechanism causes the bales to move toward the bale-accumulating area, both the flights and the fins engage the bottom of the bale and direct it toward the predetermined position.

7 Claims, 4 Drawing Figures

STACK SIDE EVENER

BACKGROUND OF THE INVENTION

The instant invention is directed generally to bale wagons, and specifically to hardware for assuring that at least one side of the stack being formed is uniform.

Over the past years, the three-table bale wagon, such as that disclosed in U.S. Pat. No. 2,848,127 to G. E. Grey, has become by far the most successful commercial apparatus of its kind. From a study of the Grey patent referred to above, one will appreciate that the bale wagon shown therein includes three tandemly arranged tables, each pivotally mounted about a transverse axis relative to the longitudinal centerline of the wagon. Bales of hay are picked up from the field and conveyed onto a first receiving table which pivots upwardly about its transverse axis to deposit the bales on a rearwardly disposed transfer table. The receiving table continues to receive bales and deposit the bales received on the transfer table until a tier of bales has been accumulated thereon. Once a full tier of bales has been accumulated on the transfer table, the transfer table is pivoted upwardly about its transverse axis, causing the tier of bales to be deposited on a rearwardly disposed load bed. The transfer table continues to function as a bale-accumulator, and continues to deposit the tiers formed thereon in succession on said load bed until a stack of bales is formed thereon, the stack being comprised of a series of side-by-side tiers.

Once the stack has been formed on the load bed, the bale wagon can then deposit the entire stack on the ground or on some other storage surface by pivoting the load bed about the transverse axis.

Another type of bale wagon demonstrated to successfully and efficiently form stacks of bales is disclosed, for example, in co-pending U.S. Pat. application Ser. No. 891,890, entitled "Bale Wagon" filed concurrently herewith in the name of the same inventor as the instant application and assigned to the same assignee which application is hereby expressly incorporated herein in its entirety by reference. This bale wagon, though somewhat similar to the above-described Grey-type bale wagon, has a bale-receiving area which is stationary and at substantially the same height as the second table. Instead of a pivoting first table the bales are pushed across the bale-receiving area onto the second table area by a horizontal pusher mechanism. The second and third tables then function substantially as described in the Grey patent, and generally known in the art.

The overall objective of a bale wagon is to form a uniform stack which is stable and permits the bales to weather in a proper manner. To a significant degree, the overall performance of a bale wagon and specifically the quality of a stack and its ability to stand over long periods of time and to be retrieved readily depends on the stack being of uniform shape and having relatively constant dimensions. In this regard, numerous efforts have been made to insure that the stacks have fairly even sides. Apparatus such as shown in U.S. Pat. No. 3,724,684 have been used on the three-table Grey-type bale wagon, and could also be used on the other above-identified type bale wagon, to move the bales on the second table to predetermined edge positions.

The solutions to the stack formation problems heretofore known have proved satisfactory; however, successful commercialization of a complex product requires that cost reduction and mechanism simplification be sought wherever possible. The invention to be described below has utility in bale wagons in general and particularly in the two types of bale wagons described above.

SUMMARY OF THE INVENTION

It is an object of the instant invention to provide a mechanism for improving the appearance and stability of a stack of bales.

It is another object of the instant invention to provide apparatus for insuring the pre-positioning of one edge of a stack of bales.

It is a further object of the instant invention to provide guide means for affixment to the bale-accumulating area of a bale wagon which direct bales during transfer thereto toward a predetermined position.

It is a still further object of the instant invention to provide a stack side evener which is durable of construction, inexpensive of manufacture and extremely effective in use.

It is an even still further object of the instant invention to provide guide means on the cross conveyor of the bale-receiving area of a bale wagon and guide means on another portion thereof which direct bales during the transfer therefrom to the bale-accumulating area toward a predetermined position.

These and other objects are accomplished according to the instant invention by providing a bale wagon employing a stack side evener comprising, in its most simple form, a plurality of fixed, spaced apart parallel fins which passively direct a moving bale toward a predetermined position. Generally, the type of bale wagon given consideration in the instant application includes a bale-receiving area onto which bales are deposited, a bale-accumulating area upon which tiers of bales are assembled, and a load rack upon which multiple tiers of bales are deposited to accomplish the formation of a stack. The wagon further includes some mechanism for moving bales from the bale-receiving area to the bale-accumulating area. The disclosed stack side evener comprises a multiplicity of fixed fins which engage the bottom of the bale during the transfer step described, and guide it toward a stop means which serves to commonly orient one side of the tier being formed. In its most complex form, the stack side evener disclosed further includes a cross conveyor on the bale-receiving area which employs conveyors flights which are angularly oriented similarly to the fins. When the transfer mechanism causes the bales to move toward the bale-accumulating area, both the flights and the fins engage the bottom of the bale and direct it toward the predetermined position.

BRIEF DESCRIPTION OF THE DRAWINGS

For a better understanding of the invention, as well as other objects and further features thereof, reference is made to the following detailed disclosure of the invention taken in conjunction with the accompanying drawings wherein.

DESCRIPTION OF THE PREFERRED EMBODIMENT

Figure 1:
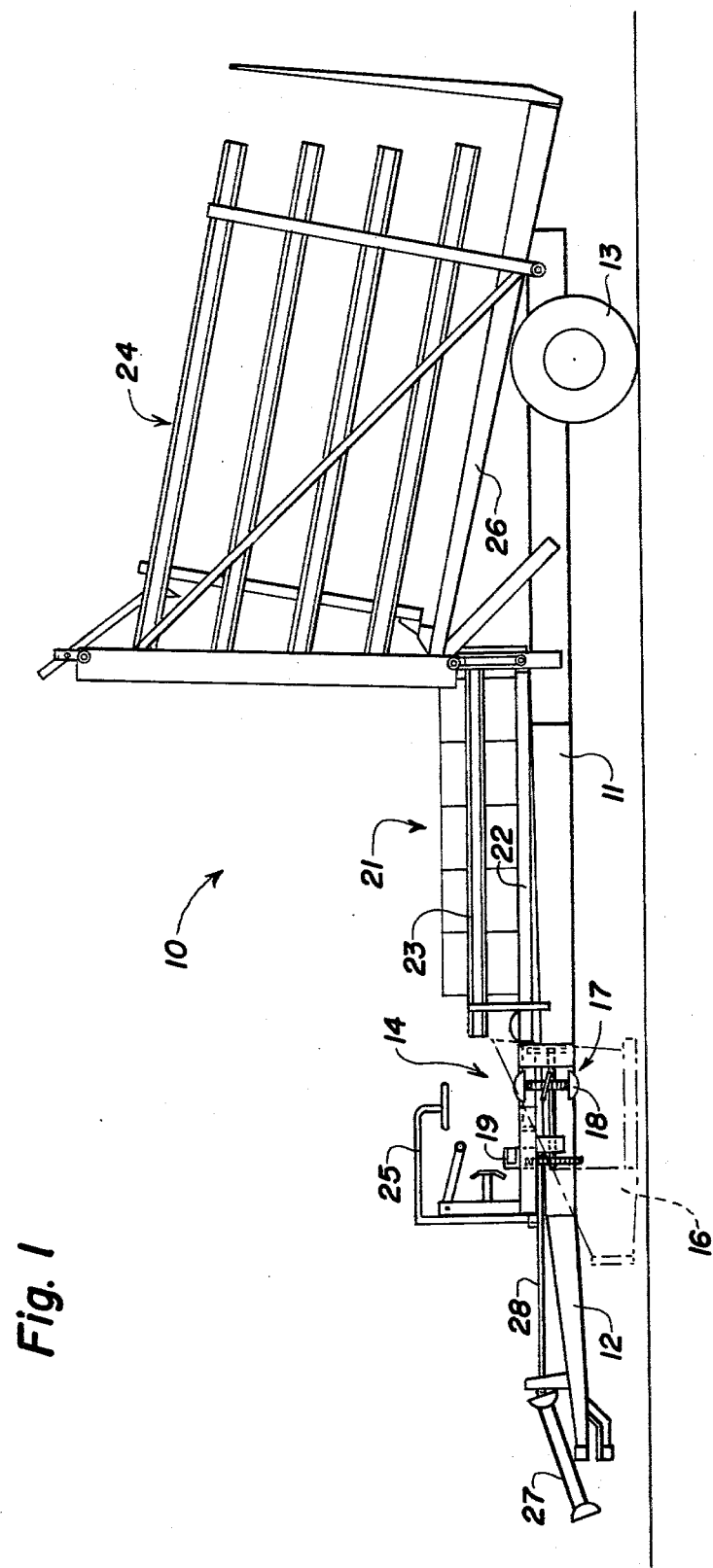
FIG. 1 is a side elevational view of a bale wagon employing the concepts of the instant invention.

Referring to FIG. 1, a general description of a bale wagon with which the instant invention may be advantageously employed will be given. Bale wagon 10 comprises a main frame 11 extending from the rear toward the front of the wagon, terminating in a tongue 12 adapted to be affixed to a tractor or other similar vehicle. The frame 11 is supported rearwardly by a pair of opposing wheels, only one of which, 13, is shown. A bale-receiving area 14 comprises a table-like surface 15 (see FIG. 2) upon which bales are serially deposited by a conventional loader 16. A cross conveyor 17 having flights 18 spaced therealong engages the bales as they are loaded and move them in line toward the opposing side of surface 15.

An elongate pusher mechanism 19 extends transversely of surface 15 and, through the action of cylinder 31 and ram 32 (best seen in FIG. 2) traverses the surface 15 to engage bales thereon and move them rearwardly.

A bale-accumulating surface 21, comprised primarily of a table 22 is positioned rearwardly of and adjacent to bale support area 14. Table 22 is pivotable about the rear end thereof in a manner taught in the Grey and other like patents described above. A pair of side rails 23 are affixed to the main frame 11 and extend upwardly along the sides of table 22 to prevent bales deposited thereon from making undesirable movements in a side direction.

At the rearmost portion of the wagon 10, there is positioned a stack forming region shown generally at 24. The stack forming mechanism shown is also in the prior art and is comprised primarily of a table 26 which is pivotally mounted to the main frame 11. Tables 22 and 26 operate in a fashion known in the prior art.

Generally, in operation, bales are picked up by loader 16 serially and deposited in a line on bale-receiving area 14. When the proper number of bales are in alignment, pusher 19 is activated to engage the bales and push them onto the forward portion of table 22. This process is repeated until table 22 reaches its capacity. Then, table 22 pivots to deposit the tier of bales onto the load rack 24 where they are held substantially stationary. The entire process is repeated until the load rack contains a predetermined number of bales. Load rack 24 may then be pivoted to deposit the stack on the ground behind the wagon.

Figure 2:
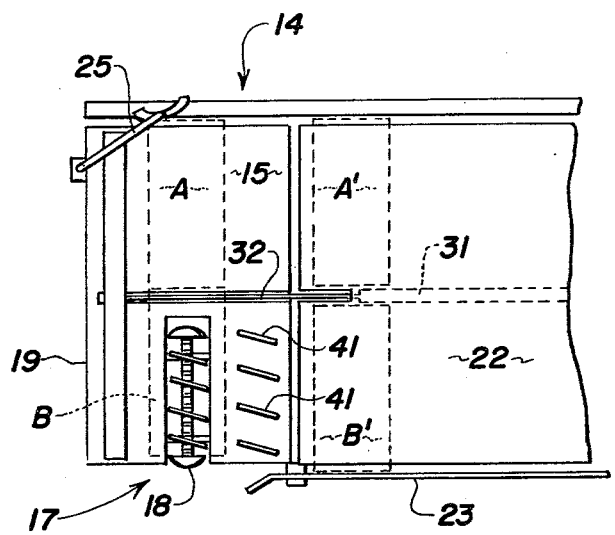
FIG. 2 is a partial top plan view of the bale wagon of FIG. 1.
Figure 3:
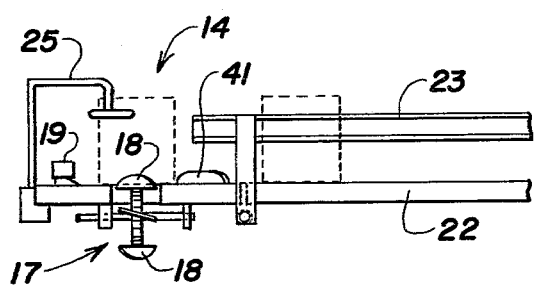
FIG. 3 is a more detailed partial side plan view of the apparatus of FIG. 2.

By more specific reference to FIGS. 2 and 3, the structure making up the instant invention can very plainly be seen. a series of fins 41 are affixed to the surface 15 and extend upwardly away therefrom. These fins are directed angularly toward one of the side rails 23. FIG. 2 shows a pair of bales A and B which have been deposited on the bale-receiving area 14. Activation of the trip arm 25 would cause the cylinder 31 to move pusher 19 rearwardly and thus move the bales to the positions denoted as A' and B'. Note that the outside edge of bale A maintains its positional integrity after engaging trip arm 25. The movement of the bales to the second position causes the B bale to ride over the upper edges of fins 41 and to slide toward the rail 23 with the maximum movement in that direction determined by the rail. Movement of bale B thus results in both edges of the stack being substantially in alignment. A side view of the fins 41 show that they have inclined, or rounded, edges which assist in allowing the bales to move thereacross. It is important that at least the forward edge be thus inclined; however, the rear edge is not so important in this regard, though a rounded rear edge would reduce bale hangups. Furthermore, it should be noted that the flights 18 on conveyor 17 are angled similarly to fins 41. Since the flights also engage the bottom of the bale, they assist during the pushing movement to reposition the bale. The number of flights and/or fins is not significant, it only being important that they be sufficient to redirect the motion of the bale away from a straight rearward path. In its most simple form, the invention need not include angled flights on the conveyor, but in the embodiment shown in FIGS. 1-3, the combined effect of the flights and the fins is more advantageous. Flights 18 may also be rounded to expedite bale engagement and disengagement.

Figure 4:
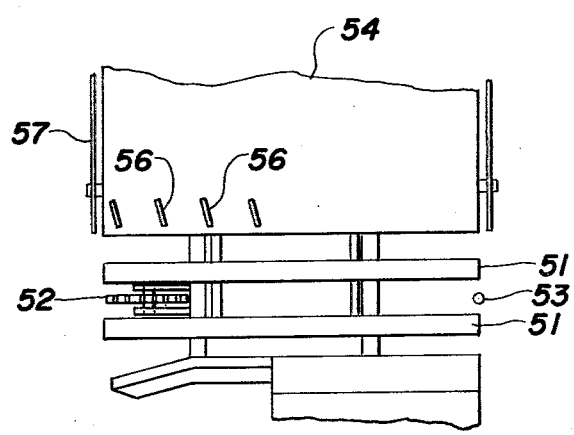
FIG. 4 is a partial top plan view of a different bale wagon than that shown in FIG. 1, employing a modified embodiment of the instant invention.

FIG. 4 is a partial top plan view of a conventional Grey-type bale wagon first and second table. One of skill in the art will recognize that the first table 51 accepts bales from the left end thereof and serially moves them, via conveyor 52, toward end switch 53. When the first table has accepted the maximum number of bales, it pivots to deposit the bales on the forward edge of the higher second table 54. Fins 56 perform generally the same function as described above with regard to FIGS. 1, 2 and 3. The only significant difference is that the left hand bale is only slightly moved toward rail 57 upon the deposit of the bales on the second table; however, the next succeeding actuation of the first table 51 will result in the left hand bale being moved toward its outermost position adjacent rail 57.

It will be understood that various other changes of the details, materials and arrangement of parts which have been herein described and illustrated in order to explain the nature of the invention will occur to and may be made by those skilled in the art, upon a reading of this disclosure, and such changes are intended to be included within the principles and scope of this invention.

Having thus described the invention, What is claimed is:

1. In a bale wagon having a mobile chassis, bale-receiving means mounted on said chassis, bale-accumulating means having first and second opposing sides and also mounted on said chassis, and means for transferring bales from said bale-receiving means to said bale-accumulating means, said bales being generally rectangular in shape with four flat surfaces and two opposing end surfaces, the improvement comprising:

stop means fixed to and extending along and above at least one of said first and second sides of said bale-accumulating means to limit the movement of bales and thereby define the outer limits of said predetermined position; and guide means fixed to said bale-accumulating means adjacent said bale-receiving means such that a bale being moved by said means for transferring will be engaged on one of its flat surfaces by said guide means and thereby directed along a path toward a predetermined position on said bale-accumulating means, said guide means comprising a series of elongate parallel spaced apart fins fixed to said bale-accumulating means and directed angularly from said bale-receiving means toward said stop means.

2. The bale wagon of claim 1 wherein said fins are at least partially curvilinear in side elevation.

3. The bale wagon of claim 1 wherein said bale-receiving means is at a lower level than said bale-accumulating means and said means for transferring includes a mechanism for tilting said bale-receiving means toward said bale-accumulating means to transfer a bale from the former to the latter.

4. The bale wagon of claim 3 wherein said fins are at least partially curvilinear in side elevation.

5. In a bale wagon having a mobile chassis, a bale-receiving means including a substantially horizontal first surface, bale-accumulating means including a second surface substantially in the same plane as said first surface and adjacent thereto, said second surface having first and second opposing sides, and a pusher mechanism for engaging bales on said first surface and displacing them onto said second surface, said bales being generally rectangular in shape with four flat surfaces and two opposing end surfaces, the improvement comprising:

stop means including a rail member supported by said chassis and extending along and above one of said first and second sides of said second surface to limit the movement of bales and thereby define the outer limits of said predetermined position; and first guide means fixed to said first surface adjacent said second surface such that one of the flat surfaces of a bale being moved by said pusher mechanism will be engaged by said first guide means and thereby directed along a path toward a predetermined position on said second surface, said first guide means comprising a series of elongate parallel spaced apart fins fixed to said first surface and directed angularly from said first surface toward said stop means.

6. The bale wagon of claim 5 further including second guide means comprising:

an endless bale conveyor on said bale-receiving means, said conveyor having spaced apart flights thereon for engaging bales and moving them across said first surface, said flights directed at an angle substantially parallel to that of said fins.

7. The bale wagon of claim 6 wherein said conveyor is adjacent said fins whereby said conveyor flights and said fins work together to guide a bale toward said predetermined position during activation of said pusher mechanism.

* * * * *